United States Patent Office 3,637,848
Patented Jan. 25, 1972

3,637,848
CERTAIN DIFLUORAMINO COMPOUNDS
Kurt Baum, Los Angeles, Calif., assignor to the United States of America as represented by the Secretary of the Navy
No Drawing. Filed Sept. 6, 1962, Ser. No. 223,576
Int. Cl. C07c 85/00
U.S. Cl. 260—563 R         33 Claims This invention relates to novel gem-difluoramino compounds and to their method of preparation.

It is an object of this invention to prepare novel gem-difluoramino compounds containing one or more groups of the formula

It is another object of this invention to react carbonyl compounds with difluoramine. It is still another object of this invention to prepare novel compounds which are useful as oxidizers, plasticizers and monomers for propellants and explosives. These and other objects of this invention will be apparent from the detailed description which follows.

The novel compounds of this invention are those having the following generic formula:

(I) 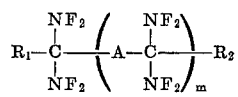

wherein A is an alkylene radical having at least two carbon atoms and preferably no more than about ten carbon atoms such as ethylene, trimethylene and decamethylene, $R_1$ and $R_2$ are selected from the group consisting of hydrogen, alkyl, haloalkyl, and alkylene radicals which join together with the gem-difluoramino groups to form a saturated carbocyclic compound containing from five to about eight carbon atoms in the ring, and $m$ is zero or a small whole number of from one to about four except in the case wherein $R_1$ and $R_2$ join to form a carbocyclic compound, in which case $m$ is zero or one.

When $R_1$ and/or $R_2$ are alkyl or haloalkyl, the preferred groups are lower alkyl and lower haloalkyl groups, i.e., those containing from one to about ten carbon atoms such as methyl, propyl, decyl, 2-chloroethyl, 4-bromo-pentyl and the like. In the above formula $R_1$, $R_2$ and A may be branched or straight-chain.

The novel compounds of this invention are prepared by reaction of an aldehyde or ketone with difluoroamine in accordance with the following general reaction equation

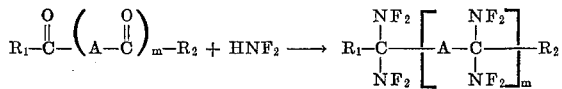

wherein A, $R_1$, $R_2$ and $m$ are as defined above.

The above reaction is carried out in the presence of a strong dehydrating acid which does not oxidize the difluoroamine. The use of such a catalyst is essential to the process. Illustrative of suitable strong dehydrating acids are boron trifluoride, sulfur trioxide, sulfuric acid containing at least ninety-one percent by weight of $H_2SO_4$, and fuming sulfuric acid; i.e., one hundred percent sulfuric acid to which has been added sulfur trioxide.

Illustrative of the carbonyl-containing compounds which may be used in the above recation are acetone, diethyl ketone, methyl ethyl ketone, 2-hexanone, 2,7-octanedione, chloroacetone, 3-methyl-2-pentanone, diisopropyl ketone, cyclohexanone, 1,4-cyclohexanedione, acetonylacetone, cyclopentanone, cyclooctanone, formaldehyde, 1,7-heptanedialdehyde, acetaldehyde, propionaldehyde, butyraldehyde, and the like. It is to be understood that these aldehydes and ketones may, in many cases, be formed in situ from precursors of the above-mentioned carbonyl compounds. Thus, formaldehyde may be supplied by s-trioxane. Similarly, acetaldehyde may be obtained from paraldehyde.

Illustrative of the various classes of gem-difluoramino compounds within the scope of Formula I, above, which may be obtained in accordance with this invention are those having the formula (II) 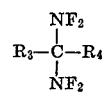

wherein $R_3$ and $R_4$ are hydrogen, alkyl or haloalkyl. Other compounds obtainable in accordance with this invention are those having the formula (III) 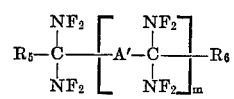

wherein $R_5$ and $R_6$ are hydrogen, alkyl or haloalkyl, A' is an alkylene radical containing at least 2 carbon atoms, and $m$ is 0 or an integer of from 1 to 4.

In the Formulae II and III, when $R_3$, $R_4$, $R_5$ and $R_6$ are alkyl or haloalkyl, the preferred chain length is from 1 to about 10 carbon atoms. Still other compounds obtainable in accordance with this invention are the cyclic materials having the formulae (IV) 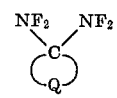

and (V) 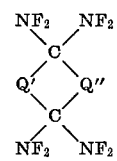

wherein Q, Q' and Q" are alkylene radicals which, together with the gem-difluoroamino groups, from saturated carbocyclic rings of from 5 to about 8 carbon atoms; that is, Q contains from 4 to about 7 carbon atoms, Q' contains from 1 to about 3 carbon atoms and Q" contains 2 or 3 carbon atoms.

It is to be understood that the compounds of Formulae II–V are prepared in accordance with this invention by the reaction of difluoramine with carbonyl compounds having the formulae

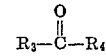

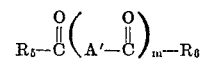

and

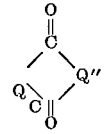

respectively.

As has already been set forth above, the process of this invention is carried out in the presence of a strong dehydrating acid. It is to be understood that this process may be carried out not only in the presence of the acid, but additionally there may be present inert solvents such as water and the lower alkanols. However, it is normally preferred that the solvent be omitted since the solvent normally serves only to dilute the acid. If a solvent is used, dilution of the acid by the solvent must be compensated for by the addition of more strong dehydrating acid.

The amount of the strong dehydrating acid employed is not critical. Normally the weight ratio of strong dehydrating acid to the carbonyl compound being reacted with difluoramine is within the ratio of from about 1 to 1, to about 100 to 1.

The temperature at which the reaction of this invention is carried out is not critical. Normally the reaction is carried out at a temperature of from about −20° C. to about +100° C. More preferably the reaction is carried out at a temperature between about −10° C. and about 35° C.

In preparing the gem-difluoramino compounds of this invention, the proportions of the reactants are not critical. Normally the carbonyl compounds and the difluoramine should be used in approximately stoichiometrically equivalent amounts since this results in the most economical operation of the process. Agitation may be utilized to improve the contact between the reactants.

The difluoramine employed in the process of this invention may be prepared from unsymmetrical difluorourea in accordance with assignee's copending application, Ser. No. 75,070, filed Dec. 6, 1960.

The novel gem-difluoramino compounds of this invention may be isolated in conventional manner; i.e., by filtration, crystallization, extraction and/or distillation.

The process of this invention may be carried out under any suitable pressure. Normally atmospheric pressure is used since it is most convenient. However, it may be sometimes desirable to conduct the reaction of this invention in a closed vessel under autogenous pressure since this has been found in some cases to improve the conversion of the carbonyl compounds to the desired gemdifluoramino compound.

The examples which follow are presented only for purposes of illustration and should not be regarded as limitative of the scope of this invention in any way. In the examples the percentages are by weight and the gas volumes are based on standard temperature and pressure unless otherwise indicated.

EXAMPLE I

Preparation of 2,2-bis(difluoramino)propane

A mixture of 8.5 g. of difluoramine and 16 ml. of sulfuric acid was refluxed in a slow stream of nitrogen using a −80° C. condenser. Acetone (1.5 g.) was added dropwise, and refluxing was continued for 4 hours. Two liquid phases were present at the end of the reaction. Nitrogen was bubbled through the mixture at a pressure of 200 mm. Hg to sweep the product into a receiver at −80° C. The product consisted of 3.2 g. of 2,2-bis(difluoramino)propane, B.P. 73° C.

EXAMPLE II

Preparation of 1,1-bis(difluoramino)cyclopentane

To a refluxing mixture of 10 g. of difluoramine and 10 ml. of sulfuric acid was added slowly 2.1 g. of cyclopentanone. After 3.5 hours the excess difluoramine was removed by flushing the system with a stream of nitrogen gas. Two liquid phases remained. The product was vacuum-transferred into a −80° C. trap at 8 mm. Hg and then distilled to give 1.7 g. of 1,1-bis(difluoramino)cyclopentane, B.P. 35.5–36° C./20 mm., $n_D^{25}$ 1.3887.

EXAMPLE III

Preparation of 3,3-bis(difluoramino)pentane

To a refluxing mixture of difluoramine (9 g.) and sulfuric acid (16 ml.), 2.15 g. (0.025 mole) of 3-pentanone was added. A layer separated during the addition. After the excess difluoramine was removed, the product was vacuum-transferred into a −80° C. trap at 10 mm. This product was distilled to give 1.4 g. of 3,3-bis(difluoramine)pentane, B.P. 40–41° C./30 mm. When sulfur trioxide is substituted for sulfuric acid in the above example, 3,3-bis(difluoramino)pentane is again obtained in good yield.

EXAMPLE IV

Preparation of 1,1-bis(difluoramino)cyclohexane

Cyclohexanone (2.45 g., 0.025 mole) was added to a refluxing mixture of 8 g. of difluoramine and 16 ml. of concentrated sulfuric acid. After the excess difluoramine was removed, the product was vacuum-transferred into a −80° C. trap at 1 mm., and distilled to give 1.45 g. of 1,1-bis(difluoramino)cyclohexane, B.P. 44° C./7 mm.

EXAMPLE V

Preparation of 1-chloro-2,2-bis(difluoramino)propane

Chloroacetone (2.3 g., 0.025 mole) was added slowly to a refluxing mixture of 8 g. of difluoramine and 16 ml. of sulfuric acid. After the excess difluoramine was removed, the product was transferred into a −80° C. trap at 5 mm. to yield 2.7 g. of a colorless liquid. Distillation gave 2.3 g. of 1-chloro-2,2-bis(difluoramino) 8-propane.

EXAMPLE VI

Preparation of 1,1,4,4-tetrakis(difluoramino)cyclohexane 1,4-cyclohexanedione (1.4 g. 0.0125 mole), dissolved in 15 ml. of concentrated sulfuric acid, and 8 g. of difluoramine was refluxed until a solid separated. The excess difluoramine was removed. The white solid was separated, filtered, washed with 50 ml. of water, and air-dried to give 2.7 g. of 1,1,4,4-tetrakis(difluoramino)cyclohexane, M.P. 103° C.

EXAMPLE VII

Preparation of 1,1-bis(difluoramino)propane

In this reaction 15 ml. of sulfuric acid was added slowly, with cooling, to 1.45 g. (0.025 mole) of propionaldehyde in difluoramine. After the volatiles were collected, the difluoramine was allowed to distill off at ambient conditions. Distillation of the residue gave two fractions, B.P. 25°C./260 mm. and 25° C./17 mm., respectively. Analysis of the first fraction showed it to be 1,1-bis(difluoramino)propane.

When the foregoing example is repeated using boron trifluoride in lieu of sulfuric acid, similar results are obtained.

EXAMPLE VIII

Preparation of 2,2,5,5-tetrakis(difluoramino)hexane

Acetonylacetone (2.32 g.) was added dropwise to a refluxing mixture of 15 ml. of concentrated sulfuric acid and approximately 7 g. of difluoramine. When the addition was completed and no further exothermic reaction was evident, the mixture was drained into a pressure reactor, which had previously been loaded with 35 ml. of 20 percent fuming sulfuric acid. The pressure reactor was cooled to −70° C. to condense the difluoramine and the needle valves were then closed. The reactor was allowed to warm to room temperature overnight, and on the following day the mixture was stirred for 7 hours at ambient temperature.

After a total reaction period of 40 hours the mixture was poured over 600 ml. of crushed ice and the product was extracted with five 50-ml. portions of methylene chloride. The methylene chloride solution was washed with 150 ml. of water and dried over sodium sulfate. The solvent was distilled off, and vacuum distillation of the residue yielded 2.03 g. of slightly yellow liquid B.P. 70°/4 mm.

The distillate was found by gas chromatography to consist of four components with the following retention times and relative areas: Compound A, 7 min., 13%; Compound B, 11 min., 13.1%; Compound C, 21 min., 59.9%; Compound D, 39 min., 13.9%.

The elemental analysis of Compound C was in agreement with the structure 2,2,5,5-tetrakis(difluoramino) hexane.

EXAMPLE IX

Preparation of bis(difluoramino)methane

Difluoramine generated from 200 ml. of difluorourea solution was allowed to reflux over 1.0 g. of s-trioxane. Fuming sulfuric acid (15 ml.) was added dropwise, and the difluoramine was allowed to reflux over this solution for 4 to 5 hours. During this time, the solution gradually became cloudy and an upper layer separated. This layer was vacuum-transferred (100 mm. Hg) to a —80° C. trap adjacent to the reactor, and 3 ml. of liquid was collected. This material was analyzed by vapor-phase chromatography and was found to consist of 95 percent bis(difluoramino)methane.

EXAMPLE X

Preparation of 3-methyl-2,2-bis(difluoramino)pentane

Difluoramine (8 g.) was refluxed over 15 ml. concentrated sulfuric acid, and 2.5 g. (0.025 mole) 3-methyl-2-pentanone was added dropwise. During the 3-hour reflux period a colorless layer separated from the solution. The excess difluoramine was removed and the product was vacuum-transferred into a —80° C. trap at 1 mm. to yield 1.39 g. of colorless liquid. Distillation gave 0.43 g. 3-methyl-2,2-gem(difluoramino)pentane, B.P. 59° C./27 mm.

EXAMPLE XI

Preparation of 2,2,7,7-tetrakis(difluoramino)octane

A solution of 2.13 g. of 2,7-octanedione in 17 ml. of conc. sulfuric acid was prepared at 0° C. Difluoramine (7 g.) was generated and allowed to reflux over this solution for 4½ hours. The excess difluoramine was then swept out. The product was extracted with three 50-ml. portions of methylene chloride. The methylene chloride solution was then washed with 50 ml. of water, dried over sodium sulfate and concentrated by distillation. Vacuum distillation of the residue gave 1.3 g. of colorless liquid, B.P. 71 to 72°/0.1 mm. This material was stirred with 4 ml. of concentrated sulfuric acid and extracted with 6 ml. of methylene chloride. The solution was washed with two 5-ml. portions of water and dried over sodium sulfate, and the solvent was removed. The residue was 0.53 g. of white solid, M.P. 60°.

The novel gem-difluoramino compounds of this invention contain a plurality of energetic N—F bonds and are thus inherently useful as explosives. In addition, the novel compounds of this invention find application as high energy components in rocket fuel formulations. Thus, for example, the compounds prepared in accordance with this invention are useful as oxidizers, plasticizers and monomers, in the preparation of rocket propellants.

The higher molecular weight compounds of this invention are suitable as plasticizers for nitro cellulose and nitro polymers such as the nitro-substituted polyurethanes disclosed in assignee's copending U.S. patent application Ser. No. 728,491, filed Apr. 14, 1958. The novel compounds of this invention are also useful in the preparation of many other organic compounds.

It will be understood that various modifications may be made in this invention without departing from the spirit thereof or the scope of the appended claims.

I claim:
1. Gem-difluoramino compounds of the formula:

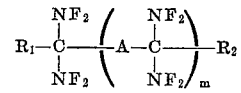

wherein A is an alkylene radical having at least 2 carbon atoms; $R_1$ and $R_2$ are selected from the group consisting of hydrogen, alkyl, haloalkyl, and alkylene radicals which join together to complete a carbocyclic compound containing from 5 to about 8 carbon atoms in the ring; and $m$ is selected from zero and an integer of from 1 to about 4 except in the case where $R_1$ and $R_2$ join to form a carbocyclic compound, $m$ is selected from the group consisting of zero and 1.

2. Gem-difluoramino compounds of the formula:

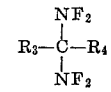

wherein $R_3$ and $R_4$ are selected from the group consisting of hydrogen, alkyl and haloalkyl.

3. Gem-difluoramino compounds of the formula:

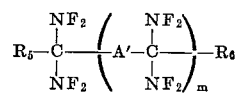

wherein $R_5$ and $R_6$ are selected from the group consisting of hydrogen alkyl and haloalkyl; A is an alkylene radical containing at least 2 carbon atoms, and $m$ is selected from zero and an integer of from 1 to about 4.

4. Gem-difluoramino compounds of the formula:

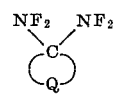

wherein Q is an alkylene radical containing from 4 to about 7 carbon atoms.

5. Gem-difluoramino compounds of the formula:

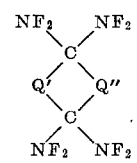

wherein Q' is an alkylene radical containing from 1 to about 3 carbon atoms and Q'' is an alkylene radical containing from 2 to about 3 carbon atoms.

6. The compound 2,2-bis(difluoramino)propane.
7. The compound 1,1-bis(difluoramino)cyclopentane.
8. The compound 1-chloro-2,2-bis(difluoramino)propane.
9. The compound 1,1,4,4-tetrakis(difluoramino)cyclohexane.
10. The compound bis(difluoramino)methane.
11. The compound 3,3-bis(difluoramino)pentane.
12. The compound 1,1-bis(difluoramino)cyclohexane.
13. The compound 1,1-bis(difluoramino)propane.
14. The compound 2,2,5,5-tetrakis(difluoramino)hexane.
15. The compound 3-methyl-2,2-bis(difluoramino)pentane.
16. The compound 2,2,7,7 - tetrakis(difluoramino)octane.
17. The method of preparing gem-difluoramino compounds of the formula

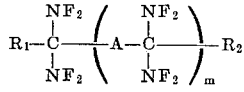

which comprises reacting difluoramine with a carbonyl compound of the formula

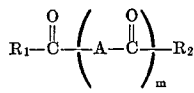

in the presence of a strong dehydrating acid, wherein in the above formulae A is an alkylene radical having at least 2 carbon atoms; $R_1$ and $R_2$ are selected from the group consisting of hydrogen, alkyl, haloalkyl, and alkylene radicals which join together to complete a carbocyclic compound containing from 5 to about 8 carbon atoms in the ring; and $m$ is selected from zero and an integer of from 1 to about 4 except in the case where $R_1$ and $R_2$ join to form a carbocyclic compound, $m$ is selected from the group consisting of zero and 1.

18. The method of preparing gem-difluoramino compounds of the formula

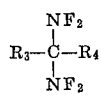

which comprises reacting difluoramine with a carbonyl compound of the formula

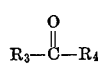

in the presence of a strong dehydrating acid, wherein in the above formula, $R_3$ and $R_4$ are selected from the group consisting of hydrogen, alkyl and haloalkyl.

19. The method of preparing gem-difluoramino compounds of the formula

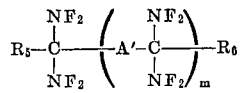

which comprises reacting difluoramine with a carbonyl compound of the formula

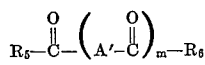

in the presence of a strong dehydrating acid, wherein in the above formulae, $R_5$ and $R_6$ are selected from the group consisting of hydrogen, alkyl and haloalkyl; A is an alkylene radical containing at least 2 carbon atoms, and $m$ is selected from zero and an integer of from 1 to about 4.

20. The method of preparing gem-difluoramino compounds of the formula

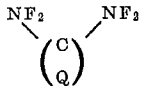

which comprises reacting difluoramine with a carbonyl compound of the formula

in the presence of a strong dehydrating acid, wherein in the above formulae, Q is an alkylene radical containing from 4 to about 7 carbon atoms.

21. The method of preparing gem-difluoramino compounds of the formula

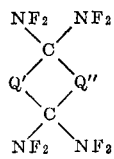

which comprises reacting difluoramine with a carbonyl compound of the formula

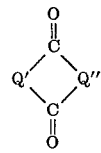

in the presence of a strong dehydrating acid wherein, in the above formulae, Q' is an alkylene radical containing from 1 to about 3 carbon atoms and Q" is an alkylene radical containing from 2 to about 3 carbon atoms.

22. The method of preparing 2,2-bis(difluoramino)propane which comprises reacting acetone with difluoramine in the presence of concentrated sulfuric acid.

23. The method of preparing 1,1-bis(difluoramino)cyclopentane which comprises reacting cyclopentanone with difluoramine in the presence of concentrated sulfuric acid.

24. The method of preparing 1-chloro-2,2-bis(difluoramino) propane which comprises reacting chloroacetone with difluoramine in the presence of concentrated sulfuric acid.

25. The method of preparing 3,3-bis(difluoramino) pentane which comprises reacting 3-pentanone with difluoramine in the presence of concentrated sulfuric acid.

26. The method of preparing 1,1-bis(difluoramino)cyclohexane which comprises reacting cyclohexanone with difluoramine in the presence of concentrated sulfuric acid.

27. The method of preparing 1,1,4,4-tetrakis(difluoramino) cyclohexane which comprises reacting 1,4-cyclohexanedione with difluoramine in the presence of sulfuric acid.

28. The method of preparing 1,1-bis(difluoramino) propane which comprises reacting propionaldehyde with difluoramine in the presence of concentrated sulfuric acid.

29. The method of preparing 2,2,5,5-tetrakis(difluoramino) hexane which comprises reacting acetonylacetone with difluoramine in the presence of concentrated sulfuric acid.

30. The method of preparing bis(difluoramino)methane which comprises reacting s-trioxane with difluoramine in the presence of concentrated sulfuric acid.

31. The method of preparing 3-methyl-2,2-bis(difluoramino) pentane which comprises reacting 3-methyl-2-pentanone with difluoramine in the presence of concentrated sulfuric acid.

32. The method of preparing 2,2,7,7-tetrakis(difluoramino) octane which comprises reacting 2,7-octanedione with difluoramine in the presence of concentrated sulfuric acid.

33. A compound selected from the group consisting of 1,1,4,4 - tetrakis(difluoramino)cyclohexane, 2,2 - bis(difluoramino)propane, and 1,1 - bis(difluoramino)cyclohexane.

References Cited

UNITED STATES PATENTS 3,432,554   3/1969   Peters et al. _____ 260—583

LELAND A. SEBASTIAN, Primary Examiner

U.S. Cl. X.R.

149—19, 88, 100, 109; 260—583 NH